(12) United States Patent
Maeda et al.

(10) Patent No.: US 8,212,512 B2
(45) Date of Patent: Jul. 3, 2012

(54) GENERATOR MOTOR FOR VEHICLE AND CONTROL METHOD FOR THE SAME

(75) Inventors: Naohide Maeda, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 780 days.

(21) Appl. No.: 12/345,986

(22) Filed: Dec. 30, 2008

(65) Prior Publication Data

US 2010/0001672 A1    Jan. 7, 2010

(30) Foreign Application Priority Data

Jul. 2, 2008    (JP) .................................. 2008-173653

(51) Int. Cl.
*H02P 7/00*    (2006.01)

(52) U.S. Cl. .............. 318/432; 318/400.22; 318/400.26; 318/832

(58) Field of Classification Search ............... 318/400.2, 318/400.22, 400.26, 832, 432; 180/65.1, 180/65.285; 903/902, 905, 906
See application file for complete search history.

(56) References Cited

U.S. PATENT DOCUMENTS

| | | | |
|---|---|---|---|
| 5,414,339 A | 5/1995 | Masaki et al. | |
| 5,877,601 A | 3/1999 | Obara et al. | |
| 6,009,003 A | 12/1999 | Yeo | |
| 7,402,968 B2 | 7/2008 | Wada et al. | |
| 7,453,231 B2 | 11/2008 | Maruyama et al. | |
| 7,659,686 B2* | 2/2010 | Osada et al. | 318/771 |
| 7,872,440 B2* | 1/2011 | Atarashi et al. | 318/772 |
| 7,898,200 B2* | 3/2011 | Atarashi et al. | 318/432 |
| 7,928,676 B2* | 4/2011 | Fujita | 318/400.26 |
| 8,002,056 B2* | 8/2011 | Chakrabarti et al. | 180/65.22 |

FOREIGN PATENT DOCUMENTS

| | | |
|---|---|---|
| JP | 5-103497 A | 4/1993 |
| JP | 6098410 A | 4/1994 |
| JP | 9294301 A | 11/1997 |
| JP | 10194613 A | 7/1998 |
| JP | 10271884 A | 10/1998 |
| JP | 2001016900 A | 1/2001 |
| JP | 2006067687 A | 3/2006 |
| JP | 2006094587 A | 4/2006 |
| JP | 2007159353 A | 6/2007 |
| JP | 2008048533 A | 2/2008 |
| JP | 2003174790 A | 6/2008 |
| WO | 2006114817 A1 | 11/2006 |

OTHER PUBLICATIONS

Japanese Office Action corresponding to Japanese Patent Application No. 2008-173653 dated Mar. 16, 2010.
Japanese Office Action correspoding to Japanese Patent Application No. 2008-173653 dated Nov. 24, 2010.

* cited by examiner

*Primary Examiner* — Walter Benson
*Assistant Examiner* — Thai Dinh
(74) *Attorney, Agent, or Firm* — Sughrue Mion, PLLC

(57) ABSTRACT

A vehicle generator motor has a generator motor that is connected to an internal combustion engine and plural sets of three-phase windings, plural sets of inverter portions connected to the respective sets of the three-phase windings, and a control circuit portion for controlling the inverter portions in accordance with the operation state of the generator motor. When the generator motor operates as a motor and a variation value of an output torque or power generation amount thereof exceeds a predetermined value, the control circuit portion controls the inverter portions so as to stop armature current flowing in at least one set in plural sets of three-phase windings.

8 Claims, 4 Drawing Sheets

GENERATOR MOTOR FOR VEHICLE AND CONTROL METHOD FOR THE SAME

BACKGROUND OF THE INVENTION

1. Field of the Invention

The present invention relates to a vehicle generator motor having plural sets of armature windings, and a method of controlling the vehicle generator motor.

2. Description of the Related Art

In order to obtain a sufficient output (power) and reduce noise under operation in a generator motor such as a three-phase synchronous motor or a generator, there has been proposed an apparatus including plural sets of armature winding systems each of which comprises three-phase armature windings (hereinafter referred to as three-phase windings) and an inverter device for controlling the three-phase windings. Furthermore, it has been proposed that when the load of the generator motor is small, the operation of some of the plural sets of armature winding systems is stopped thereby reducing the switching loss at the inverter device and enhancing the efficiency, or when some of the armature winding systems fail to operate properly, the outputs of the residual armature winding systems are increased, thereby bringing a fail-safe function (for example, JP-A-5-103497).

As described above, if a plurality of armature winding systems are provided, the output can be increased as described above. However, when a generator motor and an internal combustion engine are connected to each other, particularly when they are connected to each other through a belt, the internal combustion engine would be broken or the lifetime of the belt would be shortened if the output torque increases excessively.

Furthermore, the electrically generated output at the generator motor is normally supplied to a battery and a vehicle load. The vehicle load varies in accordance with the environment of the vehicle (for example, an air conditioner is turned on/off or the like) and thus it is not fixed. Therefore, the power generation amount of the generator motor is adjusted in conformity with required power generation amount, however, the battery normally absorbs variation of power generation amount which the generator motor cannot follow. However, when the charging capacity of the battery is large, the battery has no margin of absorbing surplus power generation amount, and thus the battery is excessively charged, which adversely affects the lifetime of the battery.

SUMMARY OF THE INVENTION

The invention has been implemented to solve the foregoing problem, and has an object to provide a vehicle generator motor having plural sets of armature winding systems that can quickly vary an output torque and a power generation amount to meet variations of the output torque and the power generation amount which exceed permissible values.

In order to attain the above object, according to a first aspect of the invention, there is provided a vehicle generator motor including a generator motor that is connected to an internal combustion engine and plural sets of three-phase windings, plural sets of inverter portions connected to the respective sets of the three-phase windings, and a control circuit portion for controlling the inverter portions in accordance with the operation state of the generator motor, wherein when the generator motor operates as a motor and a variation value of an output torque thereof exceeds a predetermined value, the control circuit portion controls the inverter portions so as to stop armature current flowing in at least one set in plural sets of three-phase windings.

According to a second aspect of the invention, there is provided a vehicle generator motor including a generator motor that is connected to an internal combustion engine and has plural sets of three-phase windings, plural sets of inverter portions connected to the three-phase windings of the respective sets of plural sets of three-phase windings, and a control circuit portion for controlling the inverter portions in accordance with the operation state of the generator motor, wherein the control circuit portion controls the inverter portions so that armature current flowing in at least one set in plural sets of three-phase windings is stopped when the generator motor operates as a generator and a variation amount of power generation amount thereof exceeds a predetermined value.

According to a third aspect of the invention, a method of controlling a vehicle generator motor having a generator motor that is connected to an internal combustion engine and has plural sets of three-phase windings, and plural sets of inverter portions connected to the respective sets of the three-phase windings, the inverter portions being controlled in accordance with the operation state of the generator motor, contains a step of judging initial explosion of the internal combustion engine, and a step of judging whether a variation value of an output torque of the generator motor exceeds a predetermined value when the generator motor is operated as a motor to start up the internal combustion engine, wherein when the initial explosion of the internal combustion engine occurs and the variation value of the output torque exceeds the predetermined value, the inverter portions are controlled so that armature current flowing in at least one set in plural sets of three-phase windings is stopped.

According to a fourth aspect of the invention, a method of controlling a vehicle generator motor having a generator motor that is connected to an internal combustion engine and has plural sets of three-phase windings, and plural sets of inverter portions connected to the respective steps of the three-phase windings, the inverter portions being controlled in accordance with the operation state of the generator motor, contains a step of instructing a power generation amount, and a step of judging whether a variation value of the power generation amount of the generator motor exceeds a predetermined value when the generator motor is operated as a generator, wherein when the variation value of the power generation amount is smaller than zero and exceeds the predetermined value, the inverter portions are controlled so that armature current flowing in at least one set in plural sets of three-phase windings is stopped.

The foregoing and other object, features, aspects and advantages of the invention will become more apparent from the following detailed description of the invention when taken in conjunction with the accompanying drawings.

DETAILED DESCRIPTION OF THE PREFERRED EMBODIMENTS

First Embodiment

Figure 1:
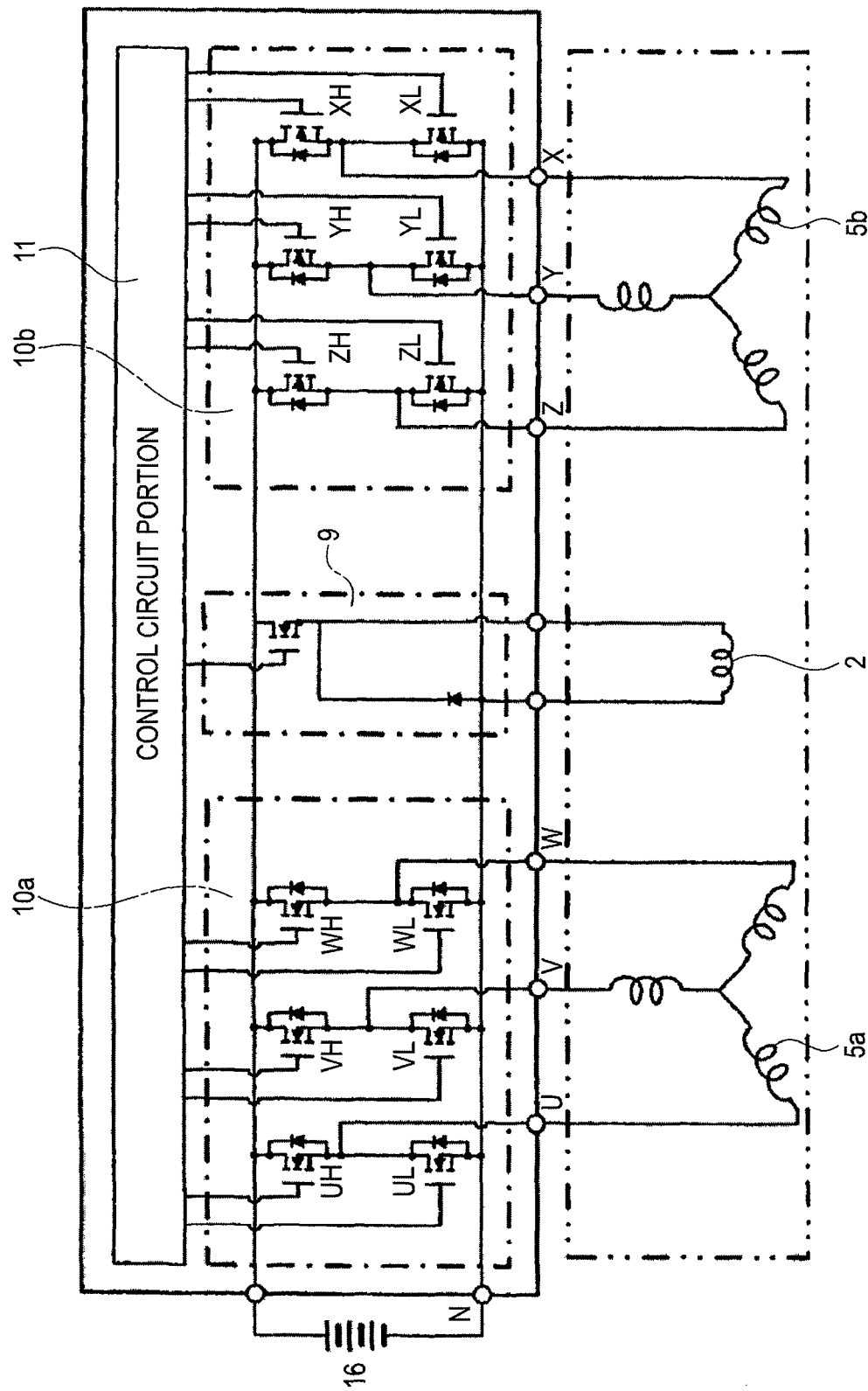
FIG. 1 is a block circuit diagram showing a generator motor according to a first embodiment of the invention.
Figure 2:
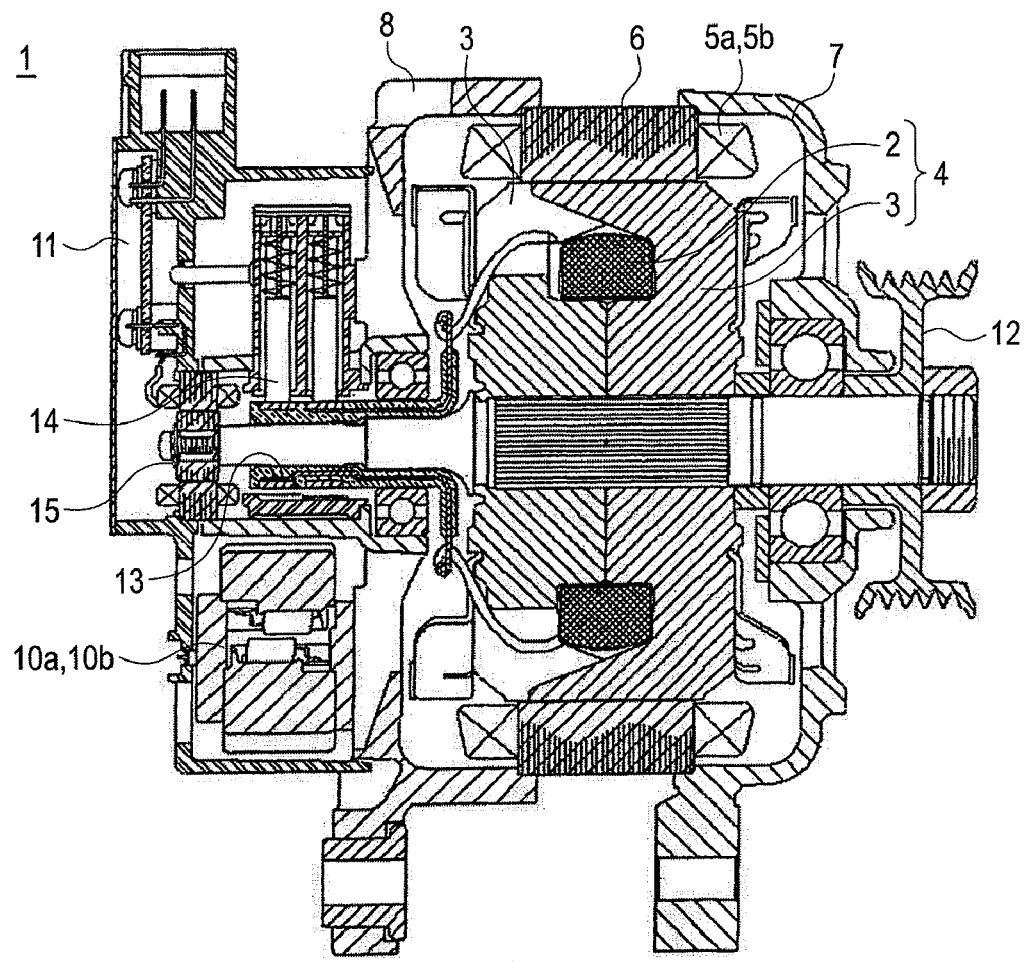
FIG. 2 is a cross-sectional view showing the generator motor according to the first embodiment of the invention.

FIG. 1 is a block circuit diagram showing a generator motor for a vehicle according to a first embodiment of the invention, and FIG. 2 is a cross-sectional view of the vehicle generator motor according to the first embodiment.

The generator motor 1 comprises a rotor 4 having a field winding 2 and a field iron core 3 surrounding the field winding 2, housings 7, 8 in which the rotor 4 is freely rotatably held, a stator 6 which is provided so as to cover the rotor 4 and has two sets of three-phase windings of three-phase windings 5a (U-phase, V-phase, W-phase) and three-phase windings 5b (X-phase, Y-phase, Z-phase), a field circuit portion 9 for supplying field current to the field winding 2, inverter portions 10a; 10b which are connected to the respective sets of the three-phase windings 5a, 5b and supply respective armature current independently of one another, and a control circuit portion 11 for controlling the inverter portions 10a, 10b in accordance with the operation state of the generator motor 1. Each of the inverter portions 10a, 10b is constructed by switching elements which are connected to one another in a three-phase bridge connection style, and these switching elements are controlled to be turned on/off by a control circuit portion 11.

The generator motor 1 is connected to the internal combustion engine through a pulley 12 secured to the end portion of the rotor 4 and a belt (not shown), and the driving force can be mutually exchanged therebetween. Furthermore, the respective parts of the generator motor are provided with sensors for measuring the rotational speed of the rotor 4, armature current, field current, the temperature of the generator motor, etc., and the measurement results are input to the control circuit portion 11. Furthermore, vehicle information necessary for the control of the generator motor is input from the external into the control circuit portion 11.

In FIG. 2, 13 represents a slip ring, 14 represents a brush holder and 15 represents a rotational sensor.

The operation of the generator motor 1 at the normal time will be described.

When the internal combustion engine is shifted from the stop state to the driving state, the control circuit portion 11 controls the armature current and the field current through the inverter portions 10a, 10b to operate the generator motor as a motor and start up the internal combustion engine. Under the driving state of the internal combustion state, the driving force is applied from the internal combustion engine to the rotor 4, the rotor 4 rotates and the generator motor 1 operates as a generator to supply power to a vehicle load and charge the battery 16.

Next, the operation of the generator motor 1 in this embodiment will be described.

In a normal driving mode, the control circuit portion 11 supplies the armature current to the three-phase windings 5a, 5b of each set and drives the generator motor 1, thereby starting up the internal combustion engine. When the torque required to rotate the internal combustion engine is rapidly reduced (for example, just after ignition of the internal combustion engine or the like), if the armature current or the field current as normal torque control means is adjusted, it is difficult to follow the variation of the torque due to the response of the respective parts. Therefore, in this embodiment, all the switching elements of at least one set of the inverter portion out of the two sets of inverter portions 10a, 10b are turned off, and the armature current flowing in at least one set out of the two sets of three-phase windings 5a, 5b is stopped. Accordingly, the torque occurring in the generator motor 1 can be reduced, and thus the generator motor 1 can surely follow the required torque.

Furthermore, when the internal combustion engine is ignited, the internal combustion engine drives the generator motor 1 as the driving source contrary to the situation before the ignition. At this time, when the generator motor 1 is being driven and operated, the tension applied between the generator motor 1 and the internal combustion engine varies rapidly, and this adversely affects the lifetime of the belt. Therefore, as in the case of the foregoing operation, the armature current is controlled, and the property of following the torque variation is enhanced, whereby the tension variation of the belt is suppressed and thus the lifetime of the belt can be extended.

Still furthermore, the generator motor 1 can be prevented from driving the internal combustion engine with an excessive torque and thus damaging the internal combustion engine.

Figure 3:
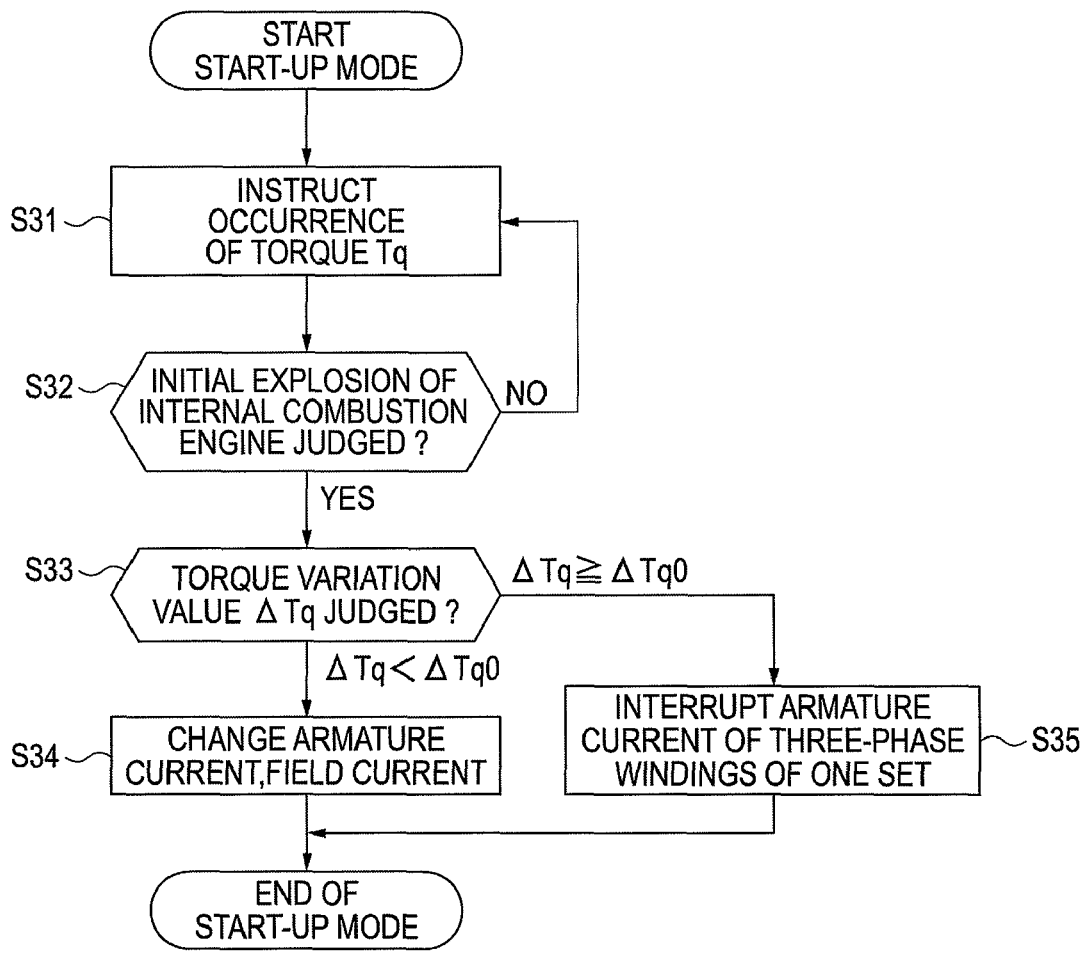
FIG. 3 is a flowchart showing an example of the operation of the first embodiment according to the invention.

FIG. 3 is a flowchart showing an example of the operation in a first electrical operation mode of the generator motor 1 in this embodiment. When start of a start-up mode of the internal combustion engine is instructed, the control circuit portion 11 receives an occurrence instruction of a torque Tq necessary to start up the internal combustion to supply the respective sets of three-phase windings 5a, 5b with required armature current and drive the generator motor 1 (step S31). In the subsequent step S32, it is judged whether initial explosion of the internal combustion engine occurs. If the occurrence of the initial explosion is confirmed, it is judged in step S33 whether the torque variation value $\Delta Tq$ (the difference between the instructed torque Tq and the present output torque) of the output torque of the generator motor 1 is not more than a predetermined value $\Delta Tq0$ or not.

If $\Delta Tq < \Delta Tq0$, the control circuit portion 11 properly adjusts the armature current and the field current of the generator motor 1 in accordance with the above condition (step S34). If $\Delta Tq \geqq \Delta Tq0$, the control circuit portion 11 turns off all the switching elements of at least one set of the two sets of inverter portions 10a, 10b of the generator motor 1, and interrupts the armature current flowing in at least one set of the two sets of three-phase windings 5a, 5b (step S35). Thereafter, the control circuit portion 11 finishes the start-up mode. When no initial explosion is confirmed in step S32, the processing is returned to step S31 again.

If the torque variation value $\Delta Tq$ of the generator motor 1 exceeds the predetermined value $\Delta Tq0$ in step S33, the armature current of any three-phase winding is gently reduced and stopped to reduce the output torque. Accordingly, the rapid reduction of the output torque is moderate, and shock to the internal combustion engine, etc. is suppressed, thereby preventing damage to the internal combustion engine and intensification of uncomfortable ride.

As described above, according to the first embodiment, in the vehicle generator motor having the generator motor 1 which is connected to the internal combustion engine and the plural sets of three-phase windings 5a, 5b, the plural sets of inverter portions 10a, 10b connected to the respective sets of the three-phase windings of the generator motor, and the control circuit portion 11 for controlling the inverter portions in accordance with the operation state of the generator motor, when the generator motor 1 operates as a motor and the variation value of the output torque thereof exceeds a predetermined value, the control circuit portion 11 controls the inverter portions 10a, 10b so as to stop the armature current flowing in at least one set of the three-phase windings out of the plural sets of the three-phase windings 5a, 5b. Accordingly, when the generator motor operates as a motor, the excessive variation of the output torque can be surely prevented, and the risk that the internal combustion engine is broken can be avoided.

Second Embodiment

The electric generation output in the normal generator motor 1 is supplied to the battery 16 and a vehicle load. The vehicle load varies in accordance with the environment of the vehicle (for example, an air conditioner is turned on/off), and it is not fixed. Therefore, the power generation amount of the generator motor 1 is adjusted in accordance with a required power generation amount, however, the variation of the power generation amount which cannot be followed is normally absorbed by the battery 16. However, when the charging capacity of the battery 16 is large, the battery has no margin to absorb a surplus power generation amount, and the battery 16 is excessively charged. This adversely affects the lifetime of the battery.

Therefore, according to this second embodiment, in the electric generating operation of the generator motor 1, when the required power generation amount is rapidly lowered, the electric generation of at least one set of three-phase windings out of the two sets of three-phase windings 5a, 5b is stopped. By reducing the number of sets of the three-phase windings, the power generation amount can be immediately reduced, and thus the generator motor 1 can respond to a power generation amount which is quickly required.

Furthermore, as a method of stopping the electric generation by the three-phase windings 5a, 5b may be applied a method of short-circuiting (three-phase short-circuiting) all the three-phase windings with which electric generation is stopped. Accordingly, the power generation amount can be reduced without changing the torque consumed in the generator motor 1, and the variation of the tension applied to the belt through which the generator motor and the internal combustion engine are connected to each other can be suppressed, so that the lifetime of the belt can be extended.

Furthermore, when the generator motor 1 is used as a regenerative brake, the reduction of the required power generation amount is absorbed by the method of this embodiment, so that the power generation amount can be reduced without reducing the consumption amount of the torque in the generator motor 1, and the reduction of the required power generation amount can be dealt with without rapidly changing the braking force of a friction brake. Accordingly, the intensification of uncomfortable ride of the vehicle can be prevented.

Figure 4:
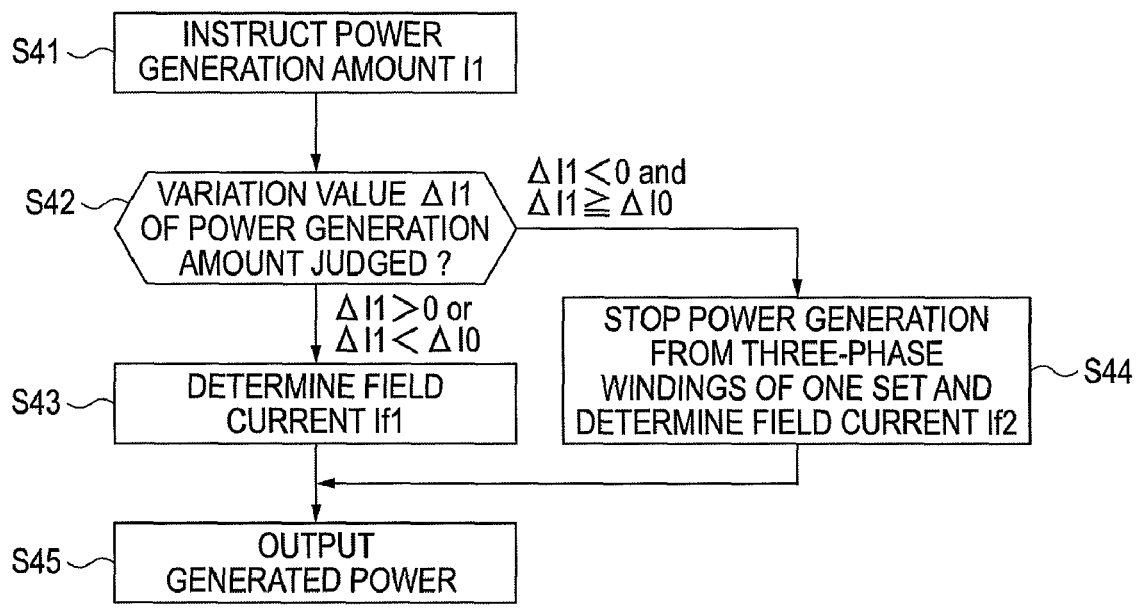
FIG. 4 is a flowchart showing an example of the operation of a second embodiment according to the invention.

FIG. 4 is a flowchart showing an example of the operation in the electric generating mode of the generator motor 1 according to the second embodiment. When a power generation amount I1 of the generator motor 1 is instructed in the electric generating mode of the generator motor 1 step S41), the control circuit portion 11 judges the variation value ΔI1 of the power generation amount (the difference between the instructed power generation amount I1 and the present power generation amount) in step S42. That is, when the variation amount ΔI1 of the power generation amount satisfies ΔI1>0 or ΔI1< predetermined value ΔI0, the corresponding field current If1 is determined (step S43). If ΔI1<0 and ΔI1≧ΔI0, all the switching elements of one inverter portion out of the two sets of inverter portions 10a, 10b are turned off, and the armature current flowing in one set of the two sets of the three-phase windings 5a, 5b is stopped (step S44). In addition, the field current If2 corresponding to this state is determined (step S44), and the inverter portions 10a, 10b and the field circuit portion 9 are controlled so that the generator motor 1 outputs the instructed power generation amount I1 (step S45).

As described above, according to the second embodiment, in the vehicle generator motor having the generator motor 1 which is connected to the internal combustion engine and has plural sets of three-phase windings 5a, 5b, plural sets of inverter portions 10a, 10b connected to the respective sets of the three-phase windings of the generator motor and the control circuit portion 11 for controlling the inverter portions in accordance with the operation state of the generator motor, the control circuit portion 11 controls the inverter portions 10a, 10b so that the armature current flowing in at least one set of the three-phase windings out of the plural sets of three-phase windings 5a, 5b is stopped when the generator motor operates as a generator and the variation amount of the power generation amount thereof exceeds a predetermined value, whereby excessive variation of the electric generating output can be surely prevented and reduction of the lifetime or breaking of the battery due to flow of excessive current into the battery can be prevented.

Third Embodiment

According to a third embodiment, the current supply to the three-phase windings 5a, 5b by the inverter portions 10a, 10b is carried out by rectangular-wave current supply. By adopting a rectangular-wave current supply control system, a smoothing capacitor required in a PWM control system can be eliminated, and thus the inverter portions 10a, 10b can be miniaturized, so that the mounting performance of the inverter portions 10a, 10b in the generator motor 1 can be improved. Furthermore, the smoothing capacitor is eliminated, and thus the cost can be reduced.

In the rectangular-wave current supply system, even when the phase is varied to limit the torque, the power consumption is not varied, but only the efficiency is lowered. However, by restricting the number of armature windings to be supplied with current, the limitation of the torque can be implemented without varying the efficiency.

In the generator motor 1 according to each of the embodiments described above, the rotor 4, the stator 6, the inverter portions 10a, 10b and the control circuit portion 11 are integrally with one another, however, these elements may be designed as separate members. Furthermore, the control circuit portion 11 may be integrated in ECU or the like.

Various modifications and alterations of this invention will be apparent to those skilled in the art without departing from the scope and spirit of this invention, and it should be understood that this is not limited to the illustrative embodiments set forth herein.

What is claimed is:

1. A vehicle generator motor comprising:
   a generator motor that is connected to an internal combustion engine and has plural sets of three-phase windings;
   plural sets of inverter portions connected to the respective sets of the three-phase windings; and
   a control circuit portion for controlling the inverter portions in accordance with the operation state of the generator motor, the control circuit portion judging initial combustion of the internal combustion engine and judging whether a variation value of an output torque of the generator motor exceeds a predetermined value when the generator motor is operated as a motor to start up the internal combustion engine, wherein when the control circuit portion judges that the initial combustion of the internal combustion engine occurs and the variation value of the output torque exceeds the predetermined value, the control circuit portion controls the inverter portions so as to stop armature current flowing in at least one set in plural sets of three-phase windings.

2. The vehicle generator motor according to claim 1, wherein the control circuit portion controls the inverter portions so that the armature current of the at least one set in plural sets of three-phase windings is gradually reduced and stopped.

3. The vehicle generator motor according to claim 1, wherein the control circuit portion turns off all of switching elements constituting the inverter portion connected to the at least one set in plural sets of three-phase windings.

4. The vehicle generator motor according to claim 1, wherein current supply to the three-phase windings by the inverter portions is carried out by rectangular-wave current supply.

5. A vehicle generator motor comprising:
a generator motor that is connected to an internal combustion engine and has plural sets of three-phase windings;
plural sets of inverter portions connected to the respective plural sets of three-phase windings; and
a control circuit portion for controlling the inverter portions in accordance with the operation state of the generator motor, the control circuit portion instructing a power generation amount and judging whether a variation value of the power generation amount of the generator motor exceeds a predetermined value when the generator motor is operated as a generator, wherein the control circuit portion controls the inverter portions so that armature current flowing in at least one set in plural sets of three-phase windings is stopped when the variation amount of the power generation amount is smaller than zero and exceeds the predetermined value.

6. The vehicle generator motor according to claim 5, wherein the control circuit portion controls the inverter portions so that the at least one set in plural sets of three-phase windings are short-circuited.

7. A method of controlling a vehicle generator motor having a generator motor that is connected to an internal combustion engine and has plural sets of three-phase windings, and plural sets of inverter portions connected to the respective sets of the three-phase windings, the inverter portions being controlled in accordance with the operation state of the generator motor, comprising a step of judging initial combustion of the internal combustion engine, and a step of judging whether a variation value of an output torque of the generator motor exceeds a predetermined value when the generator motor is operated as a motor to start up the internal combustion engine, wherein when the initial combustion of the internal combustion engine occurs and the variation value of the output torque exceeds the predetermined value, the inverter portions are controlled so that armature current flowing in at least one set in plural sets of three-phase windings is stopped.

8. A method of controlling a vehicle generator motor having a generator motor that is connected to an internal combustion engine and has plural sets of three-phase windings, and plural sets of inverter portions connected to the respective sets of the three-phase windings, the inverter portions being controlled in accordance with the operation state of the generator motor, comprising a step of instructing a power generation amount, and a step of judging whether a variation value of the power generation amount of the generator motor exceeds a predetermined value when the generator motor is operated as a generator, wherein when the variation value of the power generation amount is smaller than zero and exceeds the predetermined value, the inverter portions are controlled so that armature current flowing in at least one set in plural sets of three-phase windings is stopped.

* * * * *